United States Patent
Kelso et al.

(10) Patent No.: US 9,551,255 B2
(45) Date of Patent: Jan. 24, 2017

(54) MIXING PLATE AS STABILIZER FOR AMMONIA GAS INJECTOR

(75) Inventors: Jeffrey R. Kelso, Fort Wayne, IN (US); Jason B. Arriaga, Wheaton, IL (US); Gregory A. Griffin, Glendale Heights, IL (US); Timothy Taekhoon Yoon, Northbrook, IL (US); Adam C. Lack, Willow Springs, IL (US); Navtej Singh, Lombard, IL (US); Ryan Andrew Wacker, Marengo, IL (US); Prasanna Nagabushan-Venkatesh, Lombard, IL (US); Jorge Prieto, Chicago, IL (US)

(73) Assignee: International Engine Intellectual Property Company, LLC, Lisle, IL (US)

(*) Notice: Subject to any disclaimer, the term of this patent is extended or adjusted under 35 U.S.C. 154(b) by 0 days.

(21) Appl. No.: 14/394,121

(22) PCT Filed: Apr. 13, 2012

(86) PCT No.: PCT/US2012/033438
§ 371 (c)(1),
(2), (4) Date: Oct. 13, 2014

(87) PCT Pub. No.: WO2013/154573
PCT Pub. Date: Oct. 17, 2013

(65) Prior Publication Data
US 2015/0052879 A1 Feb. 26, 2015

(51) Int. Cl.
*F01N 1/00* (2006.01)
*F01N 3/28* (2006.01)
*F01N 3/20* (2006.01)

(52) U.S. Cl.
CPC .......... *F01N 3/2892* (2013.01); *F01N 3/208* (2013.01); *F01N 3/2066* (2013.01); *F01N 2240/20* (2013.01); *F01N 2610/02* (2013.01); *F01N 2610/1453* (2013.01); *Y02T 10/24* (2013.01)

(58) Field of Classification Search
USPC .......... 60/274, 286, 295, 297, 301, 303, 324
See application file for complete search history.

(56) References Cited

U.S. PATENT DOCUMENTS

| | | | |
|---|---|---|---|
| 8,141,353 B2* | 3/2012 | Zheng et al. | 60/324 |
| 8,539,761 B2* | 9/2013 | Lebas et al. | 60/324 |
| 8,935,918 B2* | 1/2015 | Vosz | 60/324 |
| 8,956,040 B2* | 2/2015 | Cornaglia et al. | 366/337 |
| 2007/0144158 A1* | 6/2007 | Girard et al. | 60/324 |

(Continued)

*Primary Examiner* — Binh Q Tran
(74) *Attorney, Agent, or Firm* — Jack D. Nimz; Jeffrey P. Calfa

(57) ABSTRACT

A system for mixing ammonia (reductant) with engine exhaust includes an exhaust flow created by a vehicle engine, an ammonia feed line passing into the exhaust flow, an injector connected to the feed line and positioned within the exhaust flow, the injector having at least one port for discharging ammonia into the exhaust flow, and a mixing plate positioned within the exhaust flow downstream of the ammonia injector and stabilizing at least one of either the feed line and the injector. An aspect of the invention is to stabilize the injector by attaching the mixing plate to the feed line to provide such stability. Alternatively or additionally, the mixing plate is attached to the injector to stabilize. The feed line may even pass through the mixing plate.

13 Claims, 9 Drawing Sheets

(56) References Cited

U.S. PATENT DOCUMENTS

| | | |
|---|---|---|
| 2008/0087006 A1 | 4/2008 | Wu |
| 2011/0083428 A1 | 4/2011 | Makartchouk |
| 2011/0219745 A1 | 9/2011 | Griffin |
| 2015/0113967 A1* | 4/2015 | Baldwin et al. ............... 60/307 |

* cited by examiner

·········· MAIN EXHAUST FLOW
— — — NH3 FLOW
- - - - MIXED GAS

MIXING PLATE AS STABILIZER FOR AMMONIA GAS INJECTOR

TECHNICAL FIELD

The present device relates to a NOx reduction mixing canister for a vehicle exhaust after-treatment system. Specifically, the device relates to a mixing plate used in the canister for facilitating the reduction of NOx gases in a vehicle exhaust after-treatment system.

BACKGROUND

Compression ignition engines provide advantages in fuel economy, but produce both $NO_x$ and particulates during normal operation. New and existing regulations continually challenge manufacturers to achieve good fuel economy and reduce the particulates and $NO_x$ emissions. Lean-burn engines achieve the fuel economy objective, but the high concentrations of oxygen in the exhaust of these engines yields significantly high concentrations of $NO_x$ as well. Accordingly, the use of $NO_x$ reducing exhaust treatment schemes is being employed in a growing number of systems.

One such system is the direct addition of a reducing agent or reductant, such as ammonia gas to the exhaust stream. It is an advantage to deliver ammonia directly into the exhaust stream in the form of a gas, both for simplicity of the flow control system and for efficient mixing of the reducing agent, ammonia, with the exhaust gases. The direct use of ammonia also eliminates potential difficulties related to blocking of the dosing system, which may be caused by precipitation or impurities, e.g., in a liquid-based urea solution. In addition, an aqueous urea solution cannot be dosed at a low engine load since the temperature of the exhaust line would be too low for complete conversion of urea to ammonia (and $CO_2$).

A couple specific challenges with the direct injection of ammonia relate to dispersion and mixing of the reducing agent with the hot exhaust gases. The dispersion issue considers how to deliver or spread ammonia to the greatest volume of flowing exhaust, while the mixing issue questions how to create the most homogenous mixture of exhaust and ammonia to facilitate NOx reduction.

Thus, the present system provides both a device for adequately dispersing and sufficiently mixing a reductant, such as ammonia, into an exhaust gas stream of a vehicle. These and other problems are addressed and resolved by the disclosed system and method of the present application.

SUMMARY

There is disclosed herein a device which avoids the disadvantages of prior devices while affording additional structural and operating advantages.

Generally, a system for mixing a reductant, such as ammonia, with engine exhaust comprises an exhaust flow created by a vehicle engine, a reductant feed line passing into the exhaust flow, an injector connected to the feed line and positioned within the exhaust flow, the injector having at least one port for discharging reductant into the exhaust flow, and a mixing plate positioned within the exhaust flow downstream of the injector and stabilizing at least one of either the feed line and the injector.

As an aspect of the invention is to stabilize the injector, an embodiment of the system comprises attaching the mixing plate to the feed line to provide such stability. Alternatively or additionally, the mixing plate is attached to the injector to stabilize. The feed line may even pass through the mixing plate. The mixing plate of the system is typically attached to the canister sidewall and comprises a plurality of arms each having a surface area and extending from a center of the plate, a barrier region, defined by the collective surface areas of the arms and substantially centered on the plate center, for diverting fluid flow outward, and at least first and second tiers of cut-outs.

In an embodiment of the invention, the first tier cutouts are defined by an outer edge between adjacent arms, while the second tier of cut-outs are each defined by an inner edge proximate an end of each arm. The distance from the plate center to a closest point of first tier cut-outs is a first distance and the distance from the center to a closest point of the second tier cut-outs is a second distance, the first and second distances being different.

These and other aspects of embodiments of the invention are described in the following detailed description and shown in the appended drawing figures.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated. The components in the drawings are not necessarily to scale, emphasis instead being placed upon illustrating the principles of the invention. In the following description and throughout the numerous drawings, like reference numbers are used to designate corresponding parts.

DETAILED DESCRIPTION

Figure 1:
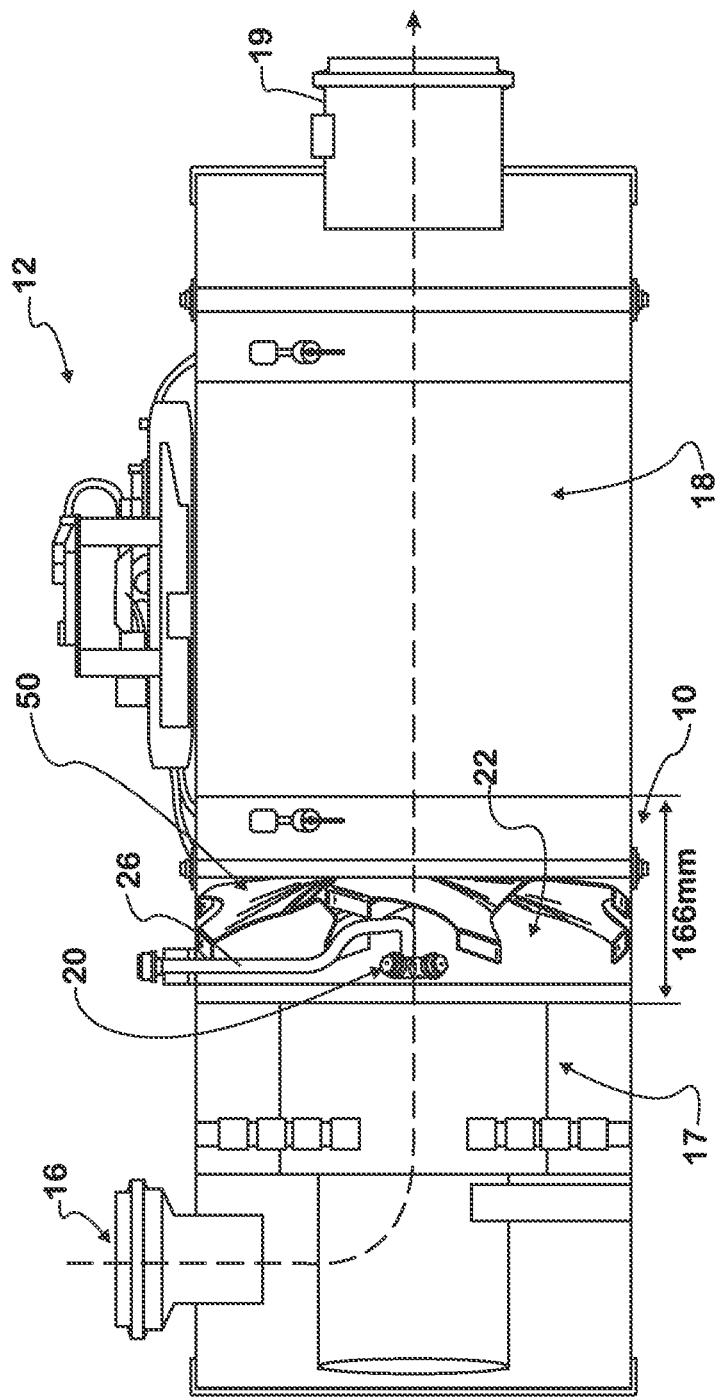
FIG. 1 is a side cross-sectional view of a vehicle after-treatment system illustrating an embodiment of the present NOx reduction system positioned within the vehicle exhaust gas.

With reference to FIGS. 1-10, embodiments of a system and methods are described to one of skill in the relevant art. Generally speaking, a NOx reduction system, designated with the reference number 10 in the figures, typically works in conjunction with an exhaust gas after-treatment system 12 and comprises a mixing chamber 22, an ammonia injector 20 and a mixing plate 50. Typically, the reductant provided for use in the system 10 is carried on-board in canisters (not shown) which require periodic recharging. While embodiments using ammonia as the preferred reductant are disclosed, the invention is not limited to such embodiments, and other reductants may be utilized instead of, or in addition to, ammonia for carrying out the inventions disclosed and claimed herein. Examples of such other, or additional reductants include, but are not limited to, urea, ammonium carbamate, and hydrogen.

Figure 2:
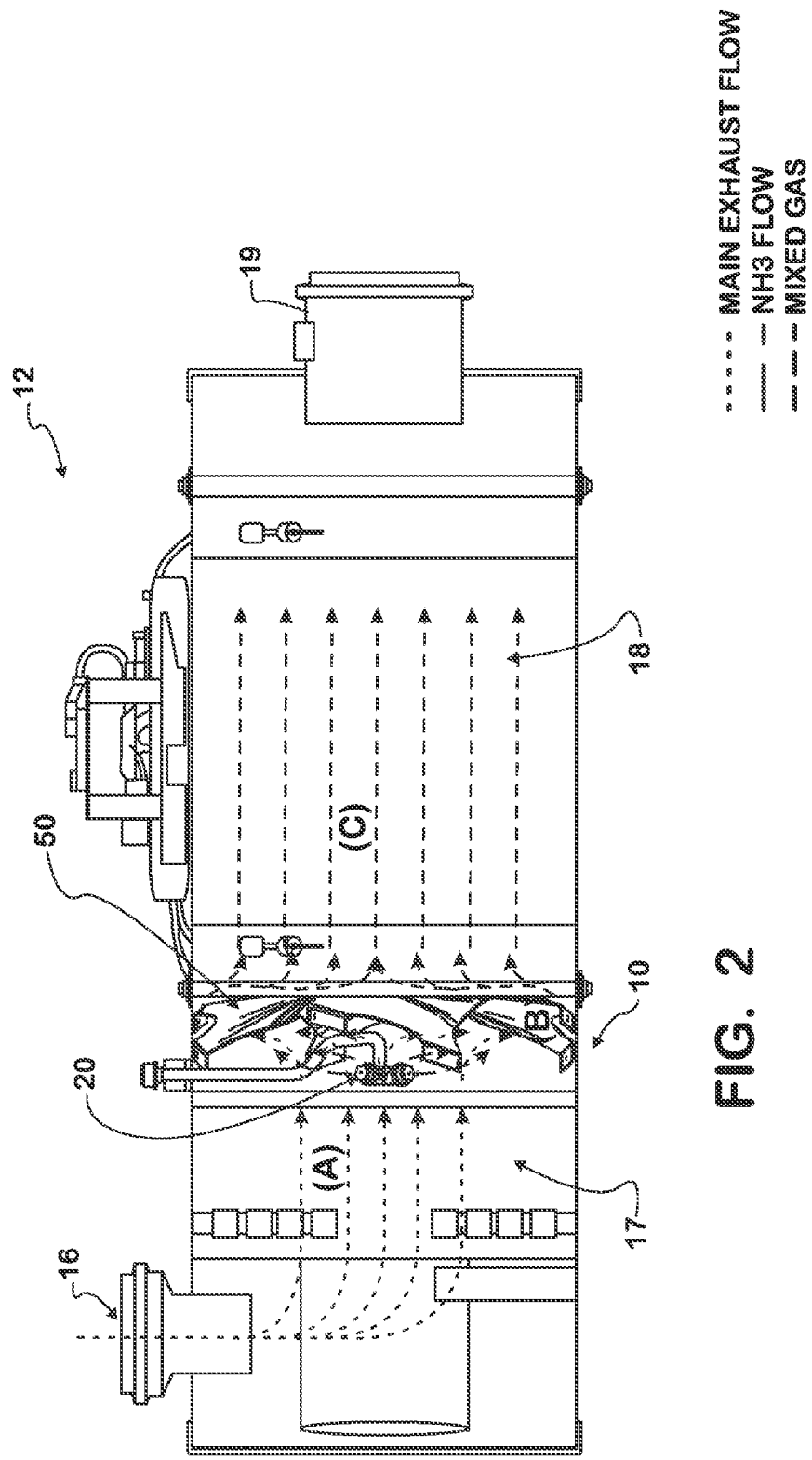
FIG. 2 is a side cross-sectional view of the vehicle after-treatment system similar to that shown in FIG. 1, further illustrating exhaust gas flow, ammonia gas dispersion and mixing of the two.

FIGS. 1 and 2 illustrate a vehicle exhaust after-treatment system 12 having, in downstream direction, an exhaust inlet 16, a diesel oxidation catalyst (DOC) canister 17, the NOx reduction device 10, a NOx particulate filter (NPF) canister 18, and an outlet 19. FIG. 2 further illustrates the exhaust stream flow before the NOx reduction device 10 (flow A), during mixing (flow B) and after the device 10 (flow C). Flow A is comprised entirely of engine exhaust gases, while the composition of flow B is (1) exhaust gases, (2) ammonia gas, and (3) a mixed gas, and flow C is comprised almost entirely of mixed gas.

Figure 3:
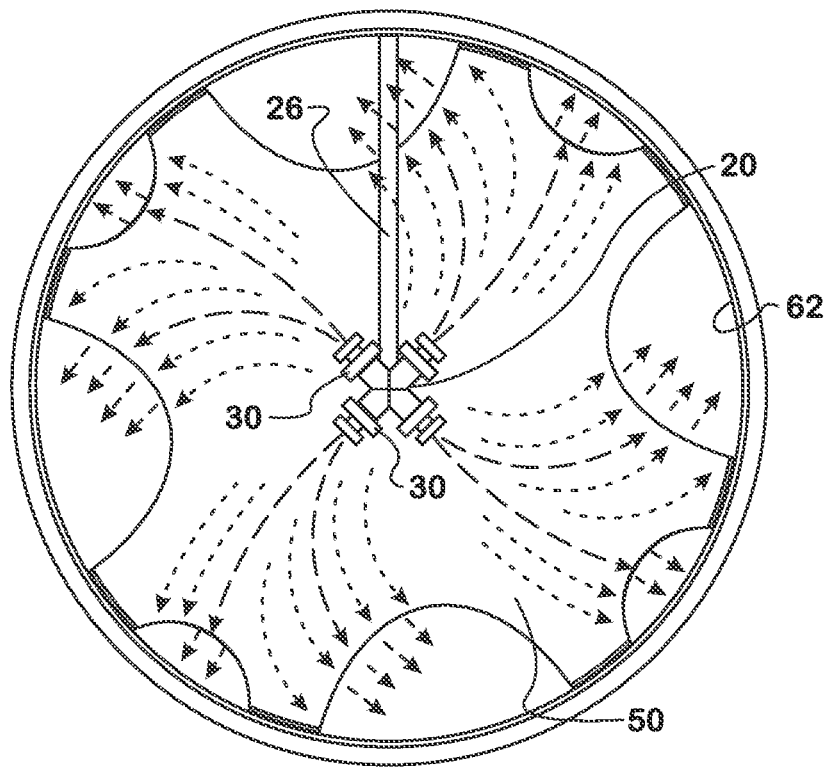
FIG. 3 is a close-up of the upstream side of an embodiment of the NOx reduction system.

FIG. 3 shows the preferred centered positioning of the injector 20 within the mixing chamber 22 (i.e., the space between the DOC and the NPF). Positioning the injector 20 in the chamber 22 center allows for optimum dispersion of the ammonia gas from a fixed, single, multi-port injector 20.

Figure 4:
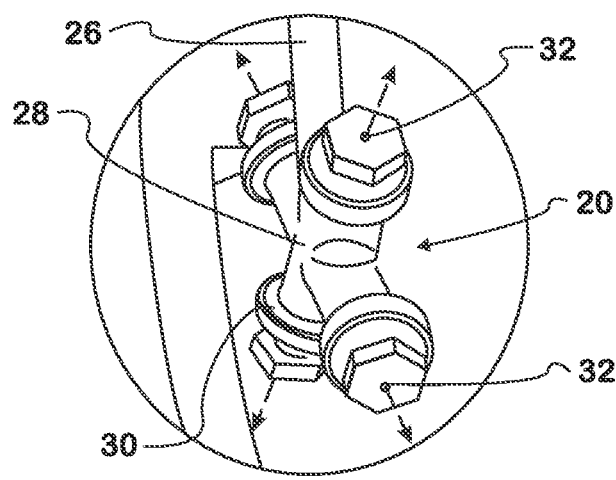
FIG. 4 is a close-up of an embodiment of the injector.
Figure 5:
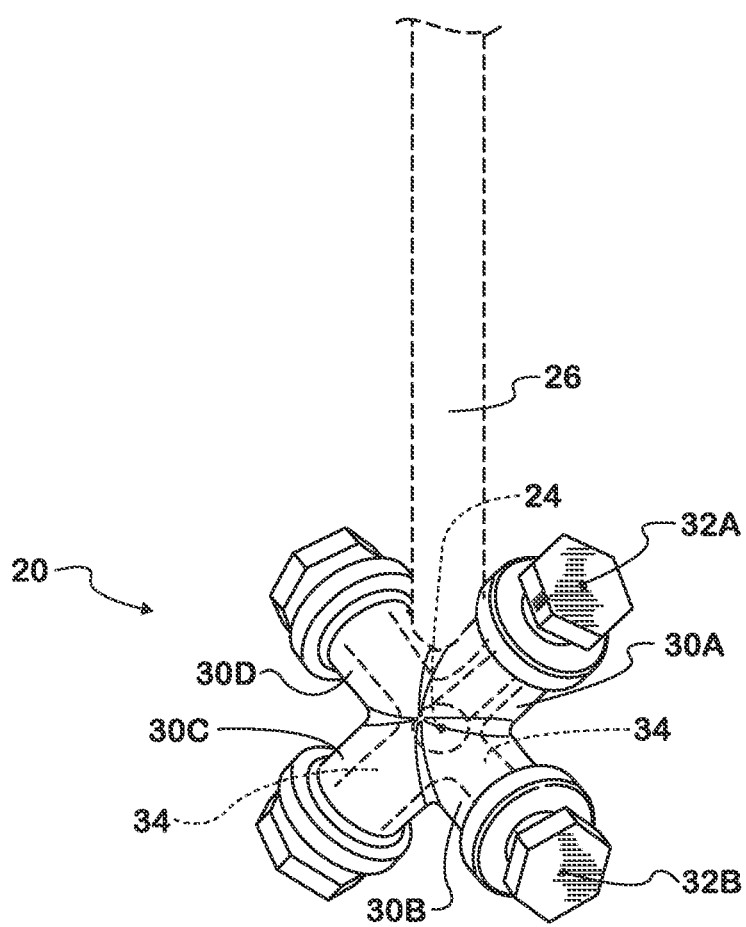
FIG. 5 is a perspective view of an embodiment of the ammonia injector.

Referring to FIGS. 3-6, preferred embodiments of the injector 20 are illustrated. Generally, the injector 20 comprises an inlet 24 which couples directly to an ammonia feed line 26 at one end and to the injector body 28 at the other end. The inlet 24 is preferably on a back surface of the injector body 28, as illustrated in FIGS. 1 and 2. Alternatively, the inlet 24 may be positioned between two adjacent arms 30, as shown in FIG. 4. Multiple discharge ports 32 are used to disperse ammonia throughout the mixing chamber 22. In the embodiment of FIGS. 3-6, four discharge ports 32A-D are positioned one at the end of each of four arms 30A-D. As shown in FIGS. 3-5, the injector 20 is formed in the shape of a cross, separating the ports 32A-D by about 90 degrees one from another. A plurality of channels 34 within the injector 20 direct the ammonia gas from the inlet 24 to the discharge ports 32.

While other multi-port injector configurations are possible, the four-port cross-injector 20 shown has proven to be most effective at disbursing ammonia throughout the mixing chamber 22. The injector 20 is positioned substantially in the center of the mixing chamber 22 with the discharge ports 32 aimed in a direction perpendicular (or substantially perpendicular) to the exhaust stream flow.

Figure 6A:
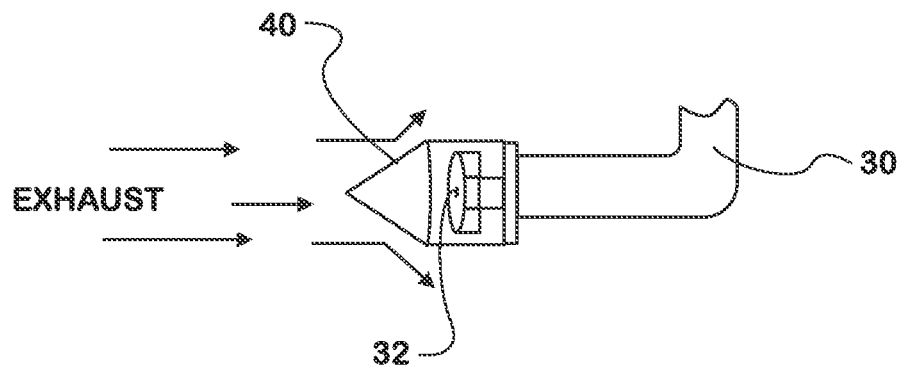
FIGS. 6A-B are side views of an alternate embodiment of the ammonia injector.
Figure 6B:
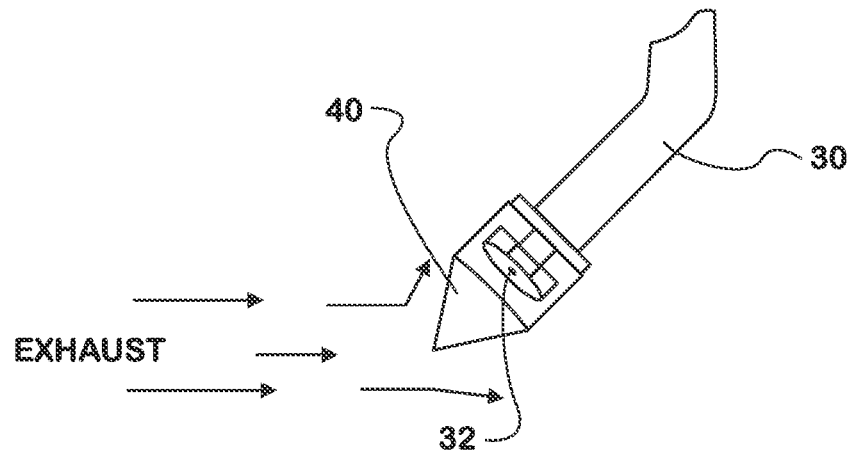

In an alternate embodiments shown in FIGS. 6A-B, the injector discharge ports 32 are aimed directly upstream (FIG. 6A) or at some angle greater than zero incident to the exhaust stream (FIG. 6B) to disburse ammonia. However, such a configuration exposes the ports to plugging. Accordingly, to prevent plugging of the discharge ports 32 with exhaust particulates, shrouds 40 are used to shield each of the ports 32. The shrouds 40 are attached to the body 28 of the injector 20 and are preferably conical in shape to minimize the creation of exhaust backflow. The number of shrouds 40 should correspond to the number of ports 32, but it may be conceivable to cover more than a single port with a shroud for some applications.

Figure 7:
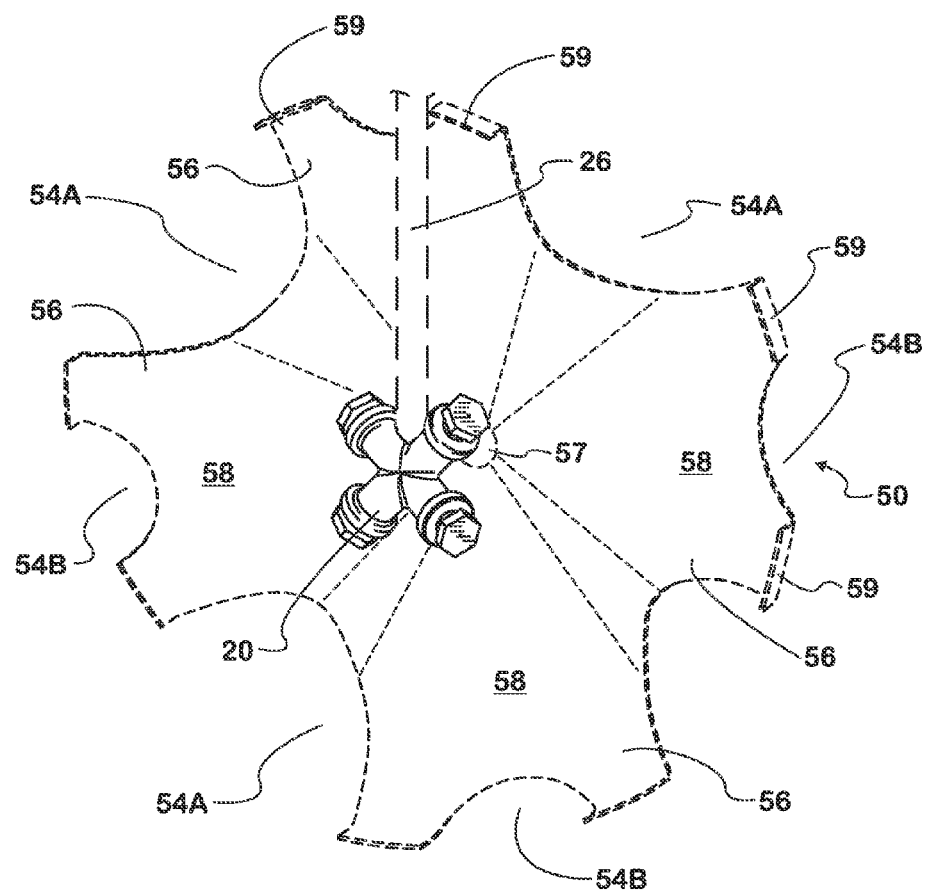
FIG. 7 is a perspective view of an embodiment of the ammonia injector positioned upstream of an embodiment of the mixing plate.
Figure 8:
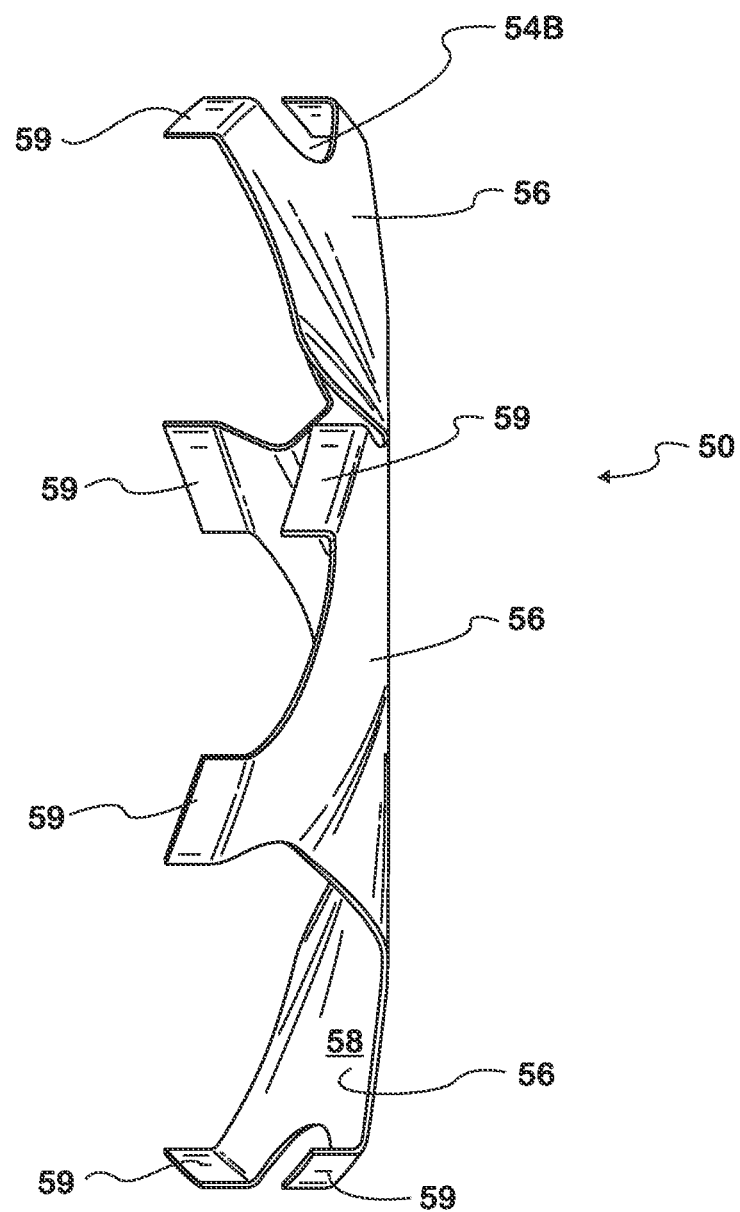
FIG. 8 is a side view of an embodiment of the mixing plate.
Figure 9:
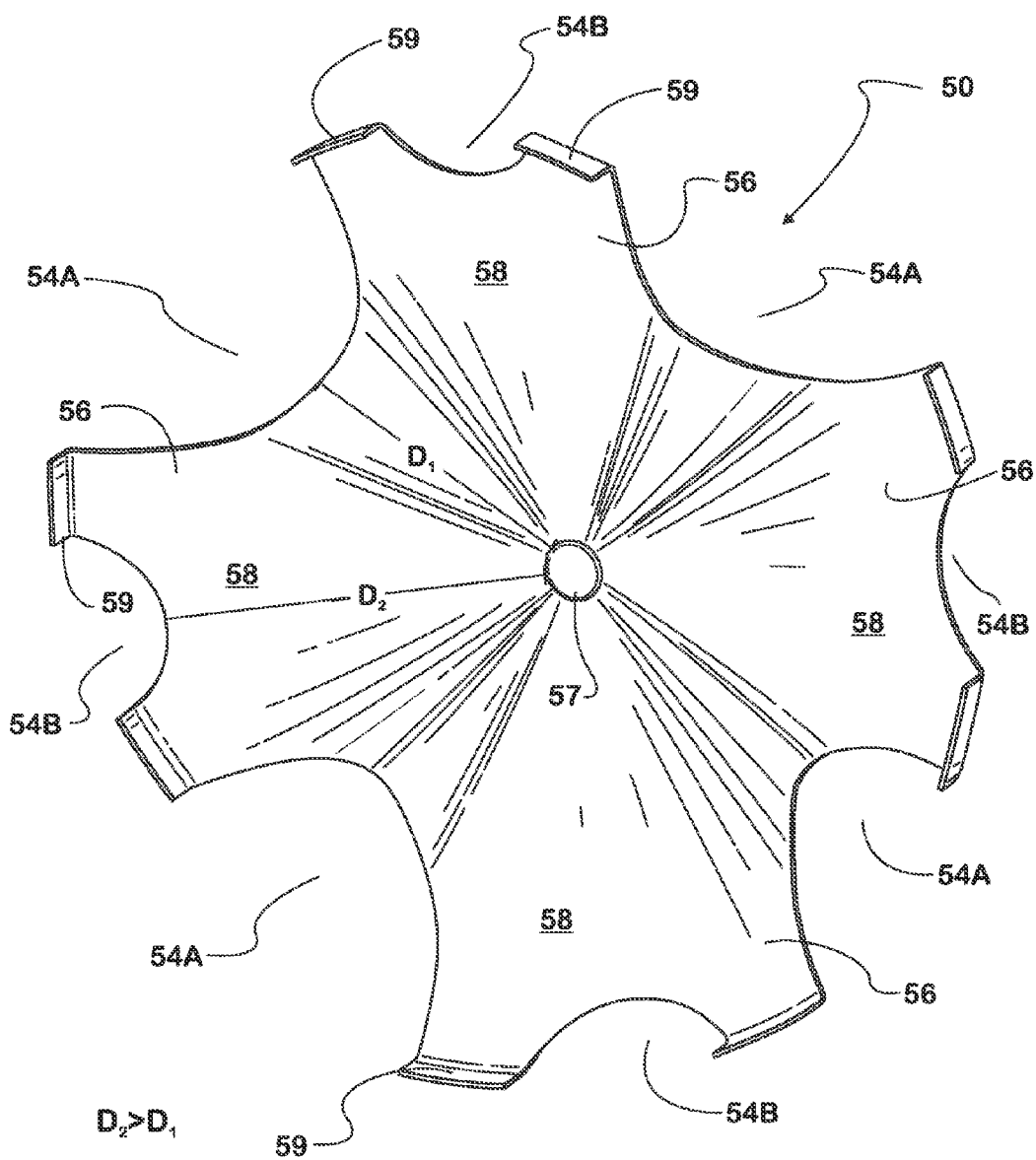
FIG. 9 is a front perspective of the mixing plate shown in FIG. 9.

Another important aspect of the NOx reduction system 10, is the use of mixing plate 50. Referring to FIGS. 7-9, the mixing plate 50 is comprised of a multi-faced, multi-armed body 52, with at least two tiers of cutouts 54 dispersed about the circumference of the plate 50. The mixing plate 50 is positioned downstream of the injector 20, as shown in FIG. 1.

In the illustrated embodiment, the mixing plate body 52 has four arms 56 extending from the plate center 57. Each arm 56 has a surface or face 58 and is similarly angled or twisted to one side, much like a fan blade, as best shown in FIG. 8. The angled plate face 58 is used to deflect the gas streams, as shown in FIG. 3, and create turbulent flow to cause efficient mixing. Tabs 59 at the end of each arm 56, with reference to FIG. 9, provide a surface for attachment of the mixing plate 50 to the canister wall 62. Other attachment means may be equally suitable.

The cutouts 54 are considered to be two-tiered because of the distance each is from the plate center. The first tier cutouts 54A are positioned between adjacent arms 56 and extend closest to the plate center, while the second tier cutouts 54B are centered at the top of each arm 56 and are shorter. As a result, the mixing gases—i.e., exhaust gases and ammonia gas—are diverted laterally before passing the plate 50 into the NPF 18. Additional cutout tiers may be used if desired. Further, while the preferred cutouts 54 are shown to be semi-circular, other shapes and sizes may be used to accomplish the desired distribution of gases within the mixing chamber 22.

Figure 10:
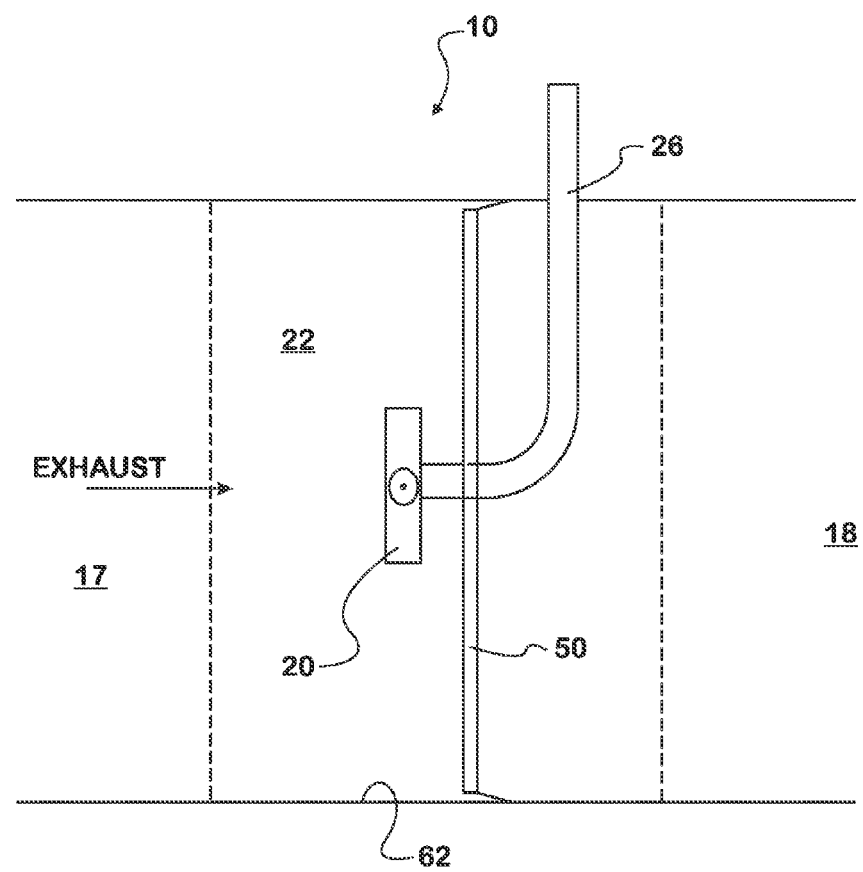
FIG. 10 is a side view illustrating the use of the mixing plate to support the injector.

Another function of the mixing plate 50 is as a support for the injector 20. As shown in FIG. 10, the ammonia feed line 26 may come into the mixing chamber 22 from downstream of the mixing plate 50 and then passes through the plate to position the injector 20 at the chamber center. The plate 50, which is secured at several points to the canister wall 62, stabilizes the injector 20, via the ammonia feed line, which is otherwise secured at a single point.

It should be emphasized that the above-described embodiments of the present invention, particularly, any "preferred" embodiments, are possible examples of implementations merely set forth for a clear understanding of the principles for the invention. Many variations and modifications may be made to the above-described embodiment(s) of the invention without substantially departing from the spirit and principles of the invention. All such modifications are intended to be included herein within the scope of this disclosure and the present invention, and protected by the following claims.

What is claimed is:

1. A system for mixing a reductant with engine exhaust, the system comprising:
   an exhaust flow created by a vehicle engine;
   a reductant feed line passing into the exhaust flow;
   an injector connected to the feed line and positioned within the exhaust flow, the injector having at least one port for discharging reductant into the exhaust flow; and
   a mixing plate positioned within the exhaust flow downstream of the reductant injector and stabilizing at least one of either the feed line and the injector; wherein the mixing plate comprises:
   a plurality of arms each having a surface area and extending from a center of the plate;
   a barrier region, defined by the collective surface areas of the arms and substantially centered on the plate center, for diverting fluid flow outward;
   a first tier of cut-outs, each defined by an outer edge between adjacent arms; and
   a second tier of cut-outs, each defined by an inner edge proximate an end of each arm;
   wherein a distance from the center to a closest point of first tier cut-outs is a first distance and the distance from the center to a closest point of the second tier cut-outs is a second distance, the first and second distances being different, and the surface of each arm being angled relative to a plane connecting the center and an outer edge of each arm.

2. The system of claim 1, wherein the mixing plate is attached to the feed line to stabilize.

3. The system of claim 1, wherein the mixing plate is attached to the injector to stabilize.

4. The system of claim 1, wherein the mixing plate is attached to both the feed line and the injector to stabilize.

5. The system of claim 1, wherein the reductant injector is approximately centered in the exhaust flow.

6. The system of claim 5, wherein the reductant injector is approximately centered to the mixing plate.

7. The system of claim 1, wherein the feed line passes through the mixing plate.

8. The system of claim 1, wherein the number of arms on the mixing plate and the number of ports on the injector are four.

9. The system of claim 1, further comprising a sidewall housing the system, wherein the mixing plate is secured to the sidewall.

10. A system for mixing ammonia with engine exhaust, the system comprising:
   an exhaust flow housing for directing engine exhaust through the system;
   an exhaust flow created by a vehicle engine;
   an ammonia feed line passing through the housing into the exhaust flow;
   an injector connected to the feed line and positioned within the exhaust flow, the injector having at least one port for discharging ammonia into the exhaust flow; and
   a mixing plate positioned within the exhaust flow downstream of the ammonia injector and stabilizing at least one of either the feed line and the injector, the mixing plate comprising:
   a plurality of arms each having a surface area and extending from a center of the plate to attach to the housing;
   a barrier region, defined by the collective surface areas of the arms and substantially centered on the plate center, for diverting fluid flow outward;
   a first tier of cut-outs, each defined by an outer edge between adjacent arms; and
   a second tier of cut-outs, each defined by an inner edge proximate an end of each arm;
   wherein a distance from the center to a closest point of first tier cut-outs is a first distance and the distance from the center to a closest point of the second tier cut-outs is a second distance, the first and second distances being different, and the surface of each arm being angled relative to a plane connecting the center and an outer edge of each arm.

11. The system of claim 10, wherein the mixing plate is attached to the feed line to stabilize.

12. The system of claim 10, wherein the mixing plate is attached to the injector to stabilize.

13. The system of claim 10, wherein the mixing plate is attached to both the feed line and the injector to stabilize.

* * * * *